(12) United States Patent
Sasaki et al.

(10) Patent No.: US 12,520,733 B2
(45) Date of Patent: Jan. 6, 2026

(54) MAGNETIC ELEMENT AND INTEGRATED DEVICE

(71) Applicant: TDK CORPORATION, Tokyo (JP)

(72) Inventors: Tomoyuki Sasaki, Tokyo (JP); Yohei Shiokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 587 days.

(21) Appl. No.: 17/912,556

(22) PCT Filed: Jul. 30, 2021

(86) PCT No.: PCT/JP2021/028497
§ 371 (c)(1),
(2) Date: Sep. 19, 2022

(87) PCT Pub. No.: WO2022/070588
PCT Pub. Date: Jul. 4, 2022

(65) Prior Publication Data
US 2023/0247916 A1  Aug. 3, 2023

(30) Foreign Application Priority Data

Oct. 2, 2020 (JP) .................................. 2020-167660

(51) Int. Cl.
*H10N 52/80* (2023.01)
*H01F 10/32* (2006.01)
*H10B 61/00* (2023.01)
*H10N 52/85* (2023.01)

(52) U.S. Cl.
CPC ......... *H10N 52/80* (2023.02); *H01F 10/3254* (2013.01); *H01F 10/3272* (2013.01); *H10B 61/00* (2023.02); *H10N 52/85* (2023.02)

(58) Field of Classification Search
CPC ........ H10N 52/80; H10N 50/10; H10N 50/80; H10N 50/20; H10B 61/00
See application file for complete search history.

(56) References Cited

U.S. PATENT DOCUMENTS

| | | | |
|---|---|---|---|
| 8,350,347 B2 | 1/2013 | Gaudin et al. | |
| 9,589,619 B2 | 3/2017 | Lee et al. | |
| 9,620,188 B2 | 4/2017 | Manipatruni et al. | |
| 2006/0056223 A1 | 3/2006 | Ditewig et al. | |
| 2006/0114714 A1 | 6/2006 | Kanegae | |

(Continued)

FOREIGN PATENT DOCUMENTS

| | | |
|---|---|---|
| JP | 2005-526351 A | 9/2005 |
| JP | 2014-045196 A | 3/2014 |

(Continued)

OTHER PUBLICATIONS

Y. K. Kato et al., "Observation of the Spin Hall Effect in Semiconductors", Science, 306, (2004), pp. 1910-1913.

(Continued)

*Primary Examiner* — Wasiul Haider
(74) *Attorney, Agent, or Firm* — Oliff PLC

(57) ABSTRACT

A magnetic element according to the present embodiment includes a wiring layer, and a first ferromagnetic layer in contact with the wiring layer, in which the wiring layer includes a crystalline first layer, and an amorphous second layer which is between the first ferromagnetic layer and the first layer.

12 Claims, 5 Drawing Sheets

(56) References Cited

U.S. PATENT DOCUMENTS

| | | |
|---|---|---|
| 2007/0035886 A1* | 2/2007 | Kagami ............... H10N 50/01 |
| 2009/0161267 A1* | 6/2009 | Kawai ............... G11B 5/3929 |
| 2011/0129691 A1 | 6/2011 | Shiwata et al. |
| 2012/0020152 A1 | 1/2012 | Gaudin et al. |
| 2013/0026585 A1 | 1/2013 | Sung et al. |
| 2014/0056060 A1 | 2/2014 | Khvalkovskiy et al. |
| 2014/0170776 A1 | 6/2014 | Satoh et al. |
| 2014/0269032 A1 | 9/2014 | Ong et al. |
| 2015/0008547 A1 | 1/2015 | Pi et al. |
| 2015/0041934 A1 | 2/2015 | Khvalkovskiy et al. |
| 2015/0129995 A1 | 5/2015 | Wang et al. |
| 2015/0200003 A1 | 7/2015 | Buhrman et al. |
| 2015/0348606 A1 | 12/2015 | Buhrman et al. |
| 2016/0020207 A1 | 1/2016 | Tsuchiya et al. |
| 2016/0021468 A1 | 1/2016 | Karunasiri et al. |
| 2016/0225982 A1 | 8/2016 | Guo |
| 2016/0359105 A1 | 12/2016 | Sandhu et al. |
| 2017/0076769 A1 | 3/2017 | Shirotori et al. |
| 2017/0076770 A1 | 3/2017 | Daibou et al. |
| 2017/0117323 A1 | 4/2017 | Braganca et al. |
| 2017/0222135 A1 | 8/2017 | Fukami et al. |
| 2018/0158588 A1 | 6/2018 | Manipatruni et al. |
| 2018/0337326 A1 | 11/2018 | Sasaki |
| 2018/0358542 A1 | 12/2018 | Mihajlovic et al. |
| 2019/0051820 A1 | 2/2019 | Sugiyama et al. |
| 2019/0131517 A1 | 5/2019 | Shiokawa et al. |
| 2019/0189516 A1 | 6/2019 | Sasaki et al. |
| 2019/0348329 A1 | 11/2019 | Shiokawa et al. |
| 2020/0212104 A1 | 7/2020 | Sonobe |
| 2020/0286536 A1 | 9/2020 | Fukami et al. |
| 2020/0388425 A1* | 12/2020 | Jung ............... H01F 10/3286 |
| 2021/0303981 A1 | 9/2021 | Sasaki et al. |
| 2021/0364580 A1 | 11/2021 | Tsumita et al. |
| 2022/0029089 A1 | 1/2022 | Sasaki et al. |
| 2022/0115440 A1 | 4/2022 | Saito et al. |

FOREIGN PATENT DOCUMENTS

| | | |
|---|---|---|
| JP | 5441005 B2 | 3/2014 |
| JP | 2016-021530 A | 2/2016 |
| JP | 2017-059594 A | 3/2017 |
| JP | 2017-059634 A | 3/2017 |
| JP | 2017-216286 A | 12/2017 |
| JP | 2019-033166 A | 2/2019 |
| JP | 6610839 B1 | 11/2019 |
| JP | 6620915 B1 | 12/2019 |
| JP | 2020-107790 A | 7/2020 |
| WO | 2014/204492 A1 | 12/2014 |
| WO | 2015/102739 A2 | 7/2015 |
| WO | 2016/021468 A1 | 2/2016 |
| WO | 2017/052494 A1 | 3/2017 |
| WO | 2017/090733 A1 | 6/2017 |
| WO | 2017/208576 A1 | 12/2017 |
| WO | 2018/189964 A1 | 10/2018 |
| WO | 2019/171715 A1 | 9/2019 |
| WO | 2020/166141 A1 | 8/2020 |

OTHER PUBLICATIONS

I. M. Miron et al., "Perpendicular switching of a single ferromagnetic layer induced by in-plane current injection", Nature, 476, (2011), pp. 189-194.

L. Liu et al., "Spin torque switching with the giant spin Hall effect of tantalum", Science, 336, 555 (2012), 32 pages.

L. Liu et al., "Current-Induced Switching of Perpendicularly Magnetized Magnetic Layers Using Spin Torque from the Spin Hall Effect", Physical Review Letters, 109, (2012), pp. 096602-1-096602-5.

K. S. Lee et al., "Threshold current for switching of a perpendicular magnetic layer induced by spin Hall effect", Applied Physics Letters, 102, 112410 (2013), 17 pages.

K. S. Lee et al., "Thermally activated switching of perpendicular magnet by spin-orbit spin torque", Applied Physics Letters, 104, (2014), pp. 072413-1-072413-5.

S. Fukami et al., "Magnetization switching by spin-orbit torque in an antiferromagnet-ferromagnet bilayer system", Nature Materials, 15, (2016), pp. 535-542.

S. Fukami et al., "A spin-orbit torque switching scheme with collinear magnetic easy axis and current configuration", nature nanotechnology, 2016, 6 pages.

S. Takahashi et al., "Spin injection and detection in magnetic nanostructures", Physical Review B 67, (2003), pp. 052409-1-052409-4.

Y. Seo et al., "Area-Efficient SOT-MRAM With a Schottky Diode", IEEE Electron Device Letters, vol. 37, No. 8, 2016, pp. 982-985.

W. Zhang et al., "Spin Hall Effects in Metallic Antiferromagnets", Physical Review Letters, 113, (2014), pp. 196602-1-196602-6.

H. Sato et al., "Perpendicular-anisotropy CoFeB-MgO magnetic tunnel junctions with a MgO/CoFeB/Ta/CoFeB/MgO recording structure", Applied Physics Letters 101, (2012), pp. 022414-1-022414-4.

L. Liu et al., "Magnetic Oscillations Driven by the Spin Hall Effect in 3-Terminal Magnetic Tunnel Junction Devices", Physical Review Letters, 109, (2012), pp. 186602-1-186602-5.

T. Kimura et al., "Electrical Control of the Direction of Spin Accumulation", Physical Review Letters, (2007), pp. 166601-1-166601-4.

G. Yu et al., "Switching of perpendicular magnetization by spin-orbit torques in the absence of external magnetic fields", Nature Nanotechnology, vol. 9, 2014, pp. 548-554.

Y. Seo et al., "High-Density SOT-MRAM Based on Shared Bitline Structure", IEEE Transactions On Very Large Scale Integration (VLSI) Systems, vol. 26, No. 8, 2018, pp. 1600-1603.

Sep. 21, 2021 International Search Report for PCT/JP2021/028497.

\* cited by examiner

MAGNETIC ELEMENT AND INTEGRATED DEVICE

TECHNICAL FIELD

The present invention relates to a magnetic element and an integrated device.

Priority is claimed on Japanese Patent Application No. 2020-167660 filed on Oct. 2, 2020, the content of which is incorporated herein by reference.

BACKGROUND ART

A giant magnetoresistance (GMR) element formed of a multilayer film including a ferromagnetic layer and a non-magnetic layer, and a tunnel magnetoresistance (TMR) element in which an insulating layer (a tunnel barrier layer, a barrier layer) is used as a non-magnetic layer are known as magnetoresistance effect elements. The magnetoresistance effect element can be applied to magnetic sensors, high-frequency components, magnetic heads, and magnetic random access memories (MRAMs).

MRAM is a storage element in which magnetoresistance effect elements are integrated. In an MRAM, data is read and written by utilizing characteristics in which a resistance of a magnetoresistance effect element changes as magnetization directions of two ferromagnetic layers sandwiching a non-magnetic layer in the magnetoresistance effect element change.

For example, Patent Literature 1 describes a method of changing a resistance of a magnetoresistance effect element by utilizing a spin-orbit torque (SOT). A SOT is induced by a spin current generated by a spin-orbit interaction or a Rashba effect at an interface between different materials. A current for inducing the SOT in a magnetoresistance effect element flows in a direction intersecting a lamination direction of the magnetoresistance effect element. There is no need to cause a current to flow in a lamination direction of the magnetoresistance effect element, and thus a prolonged life of the magnetoresistance effect element is expected.

CITATION LIST

Patent Literature

[Patent Literature 1]
PCT International Publication No. WO 2017/090733

SUMMARY OF INVENTION

Technical Problem

A magnetoresistance effect element using a spin-orbit torque records data by reversing a magnetization of a ferromagnetic layer. A magnetization of the ferromagnetic layer is reversed when a current density of an applied current is larger than or equal to a critical current density. As a critical current density required for magnetization reversal increases, power consumption of the device increases.

The present invention has been made in view of the above-described circumstances, and an objective of the present invention is to provide a magnetic element and an integrated device with low power consumption.

Solution to Problem

The present invention provides the following means to solve the above-described problems.

(1) A magnetic element according to a first aspect, includes a wiring layer, and a first ferromagnetic layer in contact with the wiring layer, in which the wiring layer includes a crystalline first layer, and an amorphous second layer which is between the first ferromagnetic layer and the first layer.

(2) In the magnetic element according to the above-described aspect, an electrical resistivity of the first layer may be lower than an electrical resistivity of the second layer.

(3) In the magnetic element according to the above-described aspect, the second layer may contain at least one element of Ta. W, Ti, and Ag.

(4) In the magnetic element according to the above-described aspect, the second layer may contain at least one element of Fe, Co, and Mn.

(5) In the magnetic element according to the above-described aspect, the second layer may contain any element of B or C.

(6) In the magnetic element according to the above-described aspect, the second layer may contain a nitride containing at least one element selected from the group consisting of Ti, V, Cr, Zr, Nb, Mo, Ta, and W.

(7) In the magnetic element according to the above-described aspect, a film thickness of the second layer may be 4 nm or less.

(8) In the magnetic element according to the above-described aspect, a film thickness of the first layer may be 4 nm or less.

(9) In the magnetic element according to the above-described aspect, the wiring layer may have a length in a first direction larger than a length in the other direction, and a length of the first layer in the first direction may be larger than a length of the second layer in the first direction.

(10) In the magnetic element according to the above-described aspect, the wiring layer may have a length in a first direction larger than a length in the other direction, and a length of the second layer in the first direction may be larger than a length of the first layer in the first direction.

(11) The magnetic element according to the above-described aspect may further include a second ferromagnetic layer and a non-magnetic layer, in which the non-magnetic layer may be sandwiched between the first ferromagnetic layer and the second ferromagnetic layer.

(12) The magnetic element according to the above-described aspect may further include a first magnetization fixed layer and a second magnetization fixed layer, in which the first magnetization fixed layer and the second magnetization fixed layer may be in contact with the wiring layer at positions sandwiching the first ferromagnetic layer, and the first ferromagnetic layer may have a magnetic domain wall inside.

(13) A magnetic element according to a second aspect includes a wiring layer, and a first ferromagnetic layer in contact with the wiring layer, in which the wiring layer has a first layer, and a second layer which is between the first ferromagnetic layer and the first layer, a diffraction pattern of the first layer is obtainable when nano-electron diffraction (NBD) is performed using a transmission electron microscope (TEM), and a diffraction pattern of the second layer is not obtainable when nano-electron diffraction (NBD) is performed using a transmission electron microscope (TEM).

(14) An integrated device according to the second aspect includes a plurality of magnetic elements according to the above-described aspects.

Advantageous Effects of Invention

Power consumption is small in the magnetoresistance effect element and the magnetic memory according to the present embodiment.

DESCRIPTION OF EMBODIMENTS

Figure 1:
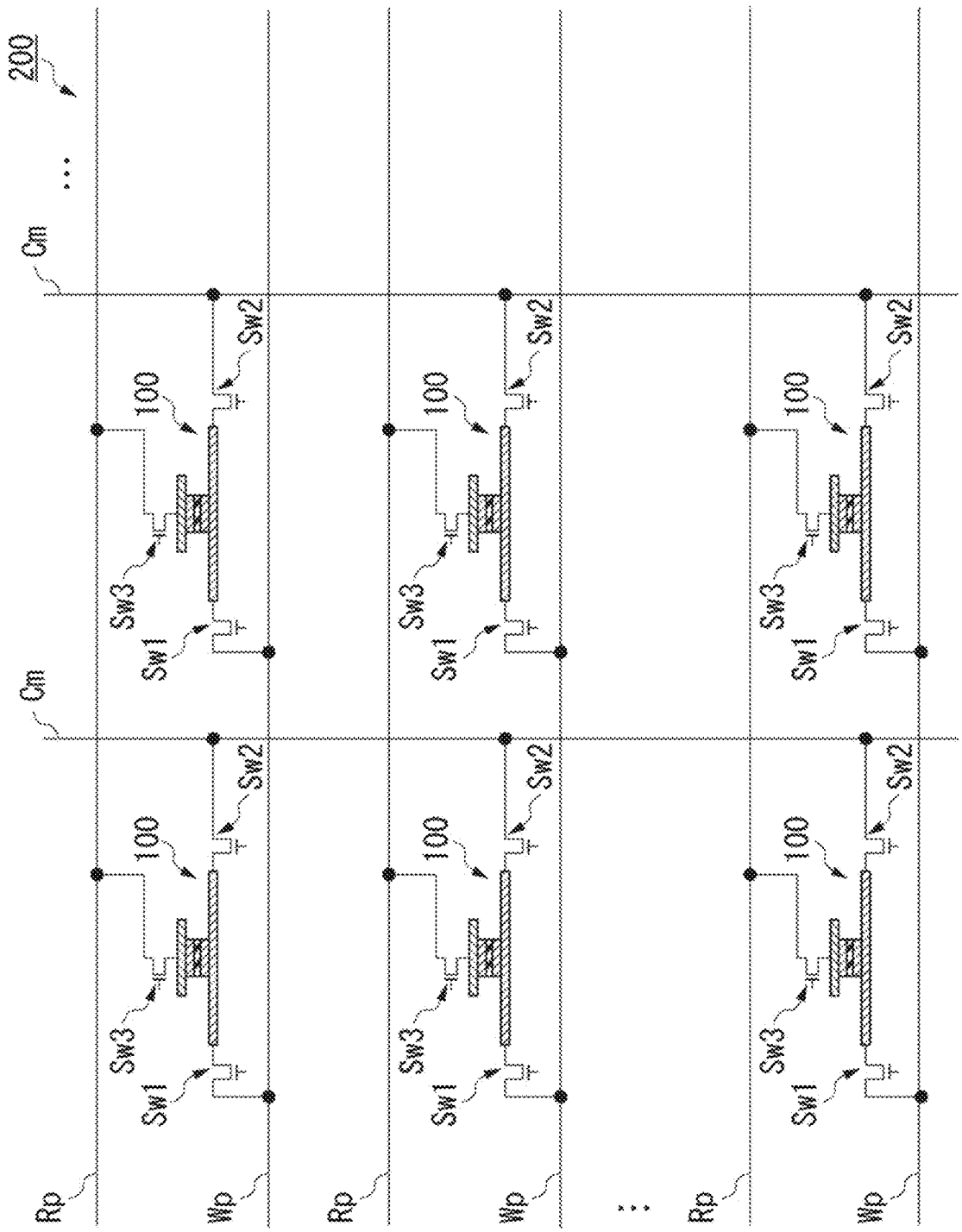
FIG. 1 is a circuit diagram of an integrated device according to a first embodiment.

Hereinafter, the present embodiment will be described in detail with reference to the drawings as appropriate. In the drawings used in the following description, there are cases in which characteristic portions are enlarged for convenience of illustration so that characteristics can be easily understood, and dimensional proportions or the like of components may be different from actual ones. Materials, dimensions, and the like illustrated in the following description are merely examples, and the present invention is not limited thereto and can be implemented with appropriate modifications within a range in which the effects of the present invention are achieved.

First, directions will be defined. One direction of one surface of a substrate Sub (see FIG. 2) to be described later is defined as an x direction, and a direction of the one surface of the substrate Sub perpendicular to the x direction is defined as a y direction. The x direction is a direction in which a wiring layer 20 extends, and is an example of a first direction. A z direction is a direction perpendicular to the x direction and the y direction. The z direction is an example of a lamination direction.

Hereinafter, a +z direction may be expressed as "upward" and a −z direction may be expressed as "downward." The "upward" and the "downward" may not necessarily coincide with a direction in which gravity is applied.

In this specification, "extending in the x direction" means that, for example, a dimension in the x direction is larger than a minimum dimension of dimensions in the x direction, the y direction, and the z direction. The same applies to cases of extending in other directions. Also, the term "connection" in the present specification is not limited to a case of being physically connected. For example, not only a case in which two layers are physically in contact with each other, but also a case in which two layers are connected with another layer sandwiched therebetween are included in the "connection," Also, a case in which two members are electrically connected is also included in the "connection."

First Embodiment

FIG. 1 is a circuit diagram of an integrated device 200 according to a first embodiment. The integrated device 200 includes a plurality of magnetoresistance effect elements 100, a plurality of write wirings Wp, a plurality of common wirings Cm, a plurality of read wirings Rp, a plurality of first switching elements Sw1, a plurality of second switching elements Sw2, and a plurality of third switching elements Sw3. The integrated device 200 can be utilized, for example, for a magnetic recording array, a magnetic memory, or the like. The magnetoresistance effect element 100 is an example of a magnetic element.

Each of the write wirings Wp electrically connects a power supply and one or more magnetoresistance effect elements 100. Each of the common wirings Cm is a wiring used at both the time of writing and reading data. The common wiring Cm electrically connects a reference potential and one or more magnetoresistance effect elements 100. The reference potential is, for example, the ground. The common wiring Cm may be provided in each of the plurality of magnetoresistance effect elements 100, or may be provided across the plurality of magnetoresistance effect elements 100. Each of the read wirings Rp electrically connects the power supply and one or more magnetoresistance effect elements 100. The power supply is connected to the integrated device 200 at the time of use.

The first switching element Sw1, the second switching element Sw2, and the third switching element Sw3 are connected to, for example, one magnetoresistance effect element 100. The first switching element Sw1 is connected between the magnetoresistance effect element 100 and the write wiring Wp. The second switching element Sw2 is connected between the magnetoresistance effect element 100 and the common wiring Cm. The third switching element Sw3 is connected between the magnetoresistance effect element 100 and the read wiring Rp.

When a predetermined first switching element Sw1 and second switching element Sw2 are turned on, a write current flows between the write wiring Wp and the common wiring Cm which are connected to the predetermined magnetoresistance effect element 100. When a predetermined second switching element Sw2 and third switching element Sw3 are turned on, a read current flows between the common wiring Cm and the read wiring Rp which are connected to the predetermined magnetoresistance effect element 100.

The first switching element Sw1, the second switching element Sw2, and the third switching element Sw3 are elements that control a flow of a current. The first switching element Sw1, the second switching element Sw2, and the third switching element Sw3 are, for example, transistors, elements utilizing a change in phase of a crystal layer such as ovonic threshold switches (OTS), elements utilizing a change in band structure such as metal-insulator transition (MIT) switches, elements utilizing a breakdown voltage such as Zener diodes and avalanche diodes, or elements whose conductivities change in accordance with change in atomic positions.

Any one of the first switching element Sw1, the second switching element Sw2, and the third switching element Sw3 may be shared by the magnetoresistance effect element 100 connected to the same wiring. For example, when the first switching element Sw1 is shared, one first switching element Sw1 is provided upstream of the write wiring Wp. For example, when the second switching element Sw2 is shared, one second switching element Sw2 is provided upstream of the common wiring Cm. For example, when the third switching element Sw3 is shared, one third switching element Sw3 is provided upstream of the read wiring Rp.

Figure 2:
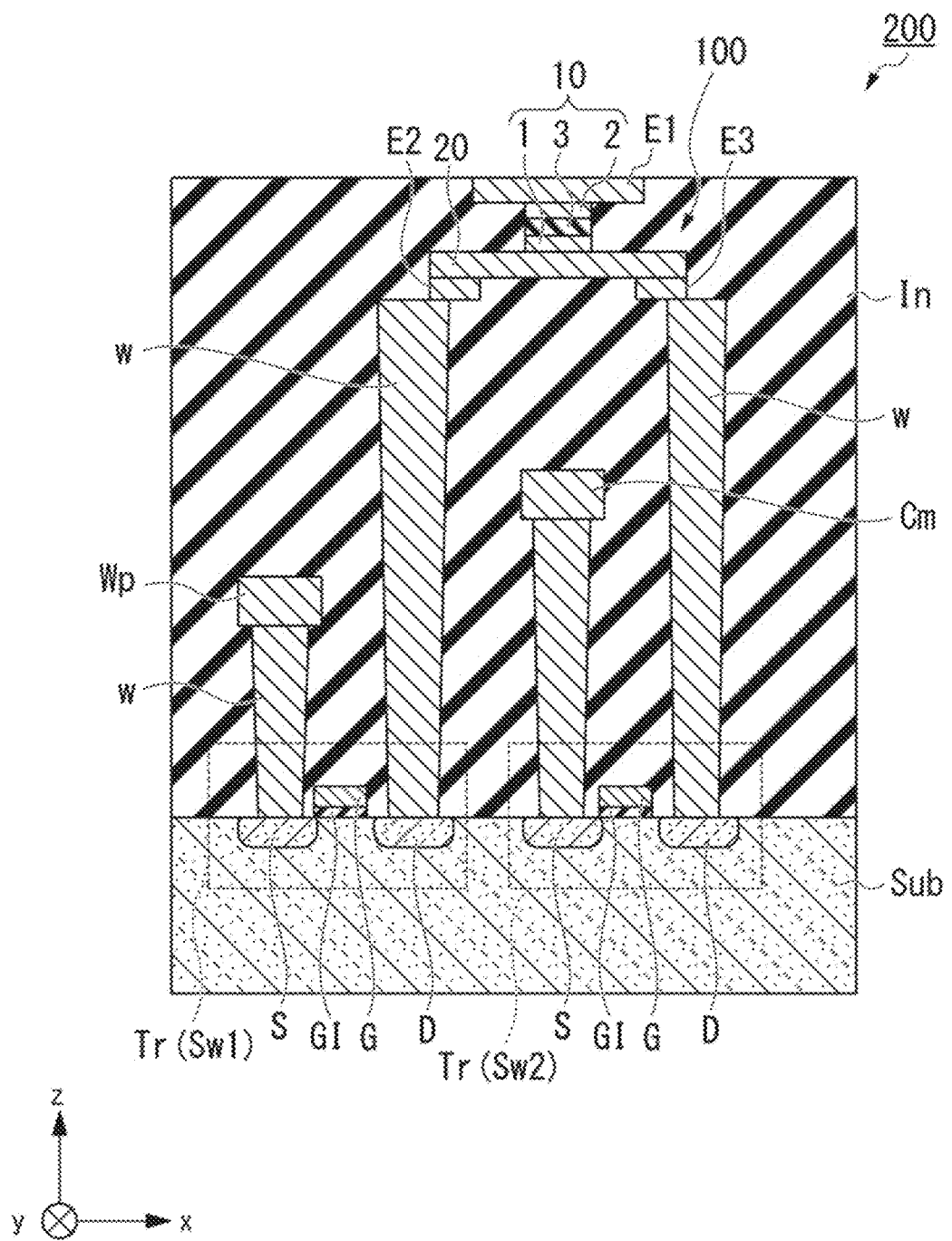
FIG. 2 is a cross-sectional view of the integrated device according to the first embodiment.

FIG. 2 is a cross-sectional view of the integrated device 200 according to the first embodiment. FIG. 2 is a cross section of the magnetoresistance effect element 100 taken along an xz plane passing through a center of a width in the y direction of the wiring layer 20 to be described later.

The first switching element Sw1 and the second switching element Sw2 illustrated in FIG. 2 are transistors Tr. The third switching element Sw3 is electrically connected to an electrode E1 and is positioned, for example, in the y direction of FIG. 2. The transistor Tr is, for example, a field effect transistor, and includes a gate electrode G, a gate insulating film GI, and a source S and a drain D formed in the substrate Sub. The substrate Sub is, for example, a semiconductor substrate.

The transistor Tr and the magnetoresistance effect element 100 are electrically connected via a wiring w and electrodes E2 and E3. Also, the transistor Tr is connected to the write wiring Wp or the common wiring Cm by the wiring w. The wiring w may be referred to as, for example, a connection wiring, a via wiring, or an interlayer wiring. The wiring w and the electrodes E2 and E3 contain a material having conductivity. The wiring w extends, for example, in the z direction.

A vicinity of the magnetoresistance effect element 100 and the transistor Tr is covered with an insulator In. The insulator in is an insulator that insulates between wirings of multilayer wirings and between elements. The insulator In may be formed of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$) or the like.

Figure 3:
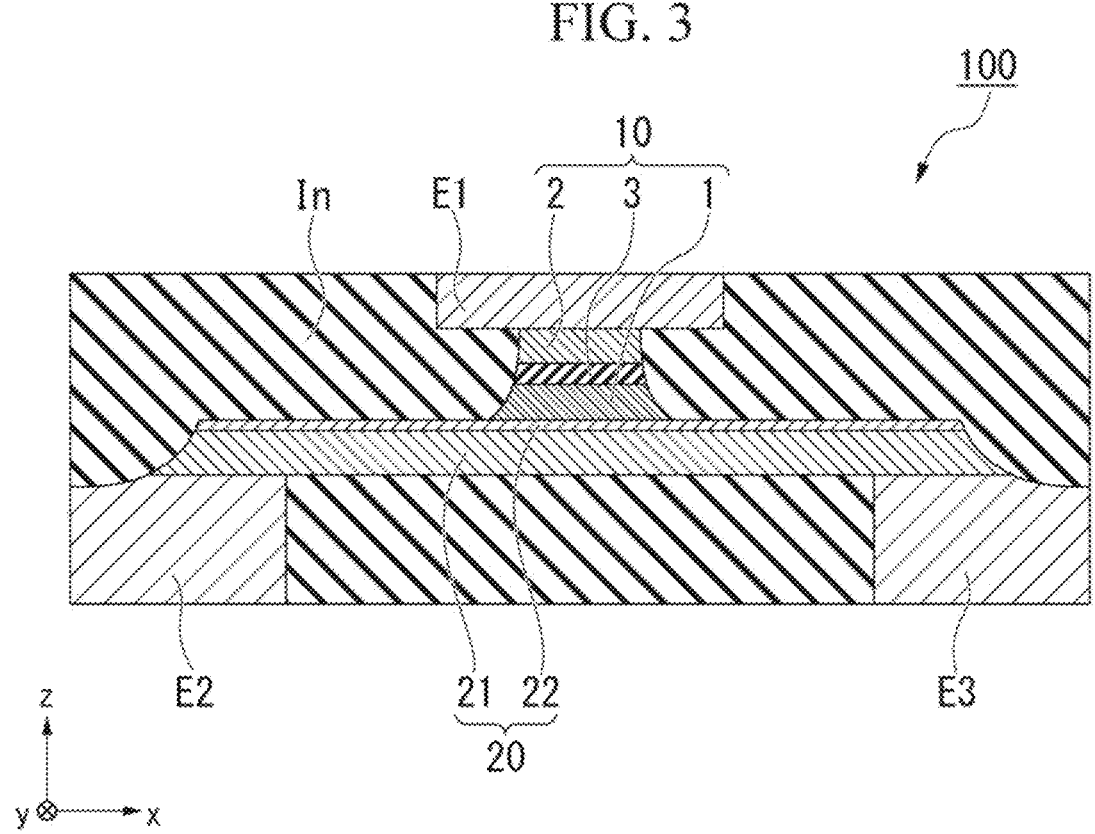
FIG. 3 is a cross-sectional view of a magnetic element according to the first embodiment.

FIG. 3 is a cross-sectional view of the magnetoresistance effect element 100 according to the first embodiment. FIG. 3 is a cross section of the magnetoresistance effect element 100 taken along the xz plane.

The magnetoresistance effect element 100 includes, for example, a laminate 10 and the wiring layer 20. The magnetoresistance effect element 100 is a magnetic element utilizing a spin-orbit torque (SOT), and may be referred to as a spin-orbit torque magnetoresistance effect element, a spin-injection magnetoresistance effect element, or a spin-current magnetoresistance effect element.

The laminate 10 includes a first ferromagnetic layer 1, a non-magnetic layer 3, and a second ferromagnetic layer 2 in order from a side closer to the substrate Sub. The laminate 10 is laminated on the wiring layer 20. The laminate 10 is sandwiched between the wiring layer 20 and the electrode E1 in the z direction. The laminate 10 is a columnar body. The laminate 10 gradually widens from an upper surface toward a lower surface. A shape of the laminate 10 in a plan view from the z direction may be, for example, a circle, an ellipse, or a quadrangle.

The first ferromagnetic layer 1 and the second ferromagnetic layer 2 each contain a ferromagnetic material. The ferromagnetic material may be, for example, a metal selected from the group consisting of Cr, Mn, Co, Fe, and Ni, an alloy containing one or more of these metals, an alloy containing these metals and at least one element of B, C, and N, or the like. The ferromagnetic material may be, for example, Co—Fe, Co—Fe—B, Ni—Fe, a Co—Ho alloy, a Sm—Fe alloy, an Fe—Pt alloy, a Co—Pt alloy, or a CoCrPt alloy.

The first ferromagnetic layer 1 and the second ferromagnetic layer 2 may contain a Heusler alloy. A Heusler alloy contains an intermetallic compound having a chemical composition of XYZ or $X_2YZ$. X indicates a transition metal element of the Co, Fe, Ni, or Cu groups, or a noble metal element in the periodic table. Y indicates a transition metal of the Mn, V, Cr, or Ti groups, or types of the X element, and Z indicates a typical element from Group III to Group V. The Heusler alloy may be, for example, $Co_2FeSi$, $Co_2FeGe$, $Co_2FeGa$, $Co_2MnSi$, $Co_2Mn_{1-a}Fe_aAl_bS_{1-b}$, $Co_2FeGe_{1-c}Ga_c$, or the like. The Heusler alloy has a high spin polarization.

The first ferromagnetic layer 1 and the second ferromagnetic layer 2 are, for example, perpendicular magnetization films of which axes of easy magnetization are in the z direction. The first ferromagnetic layer 1 and the second ferromagnetic layer 2 may be, for example, in-plane magnetic films in which the axes of easy magnetization are oriented in any direction in the xy plane.

An orientation direction of a magnetization of the second ferromagnetic layer 2 is less likely to change than a magnetization of the first ferromagnetic layer 1 when a predetermined external force is applied. The second ferromagnetic layer 2 is referred to as a magnetization fixed layer or a magnetization reference layer, and the first ferromagnetic layer 1 is referred to as a magnetization free layer. The laminate 10 has a top pin structure in which the magnetization fixed layer is on a side far from the substrate Sub. A resistance value of the laminate 10 changes according to a difference in relative angle between a magnetization of the first ferromagnetic layer 1 and a magnetization of the second ferromagnetic layer 2 sandwiching the non-magnetic layer 3.

The non-magnetic layer 3 is formed of a non-magnetic material. When the non-magnetic layer 3 is an insulator (in a case of a tunnel barrier layer), for example, $Al_2O_3$, $SiO_2$, MgO, $MgAl_2O_4$, or the like can be used for a material thereof. In addition to these materials, a material in which a part of Al, Si, and Mg is substituted with Zn, Be, or the like can also be used. Of these, since MgO and $MgAl_2O_4$ are materials that can realize coherent tunneling, spin can be efficiently injected. When the non-magnetic layer 3 is a metal, Cu, Au, Ag, or the like can be used for a material thereof. Further, when the non-magnetic layer 3 is a semiconductor, Si, Ge, $CuInSe_2$, $CuGaSe_2$, $Cu(In, Ga)Se_2$, or the like can be used for a material thereof.

The laminate 10 may have a layer other than the first ferromagnetic layer 1, the non-magnetic layer 3, and the second ferromagnetic layer 2. For example, a spacer layer and a third ferromagnetic layer may be provided on a surface of the second ferromagnetic layer 2 opposite to the non-magnetic layer 3. When the second ferromagnetic layer 2 and the third ferromagnetic layer are magnetically coupled, a magnetization stability of the second ferromagnetic layer 2 increases. The second ferromagnetic layer, the spacer layer, and the third ferromagnetic layer have a synthetic antiferromagnetic structure (SAF structure). The third ferromagnetic layer can use a material the same as that of the first ferromagnetic layer 1. The third ferromagnetic layer is preferably, for example, only a magnetic film such as Co/Ni or Co/Pt, or a perpendicular magnetization film formed by a multilayer film of a magnetic film and a non-magnetic film. The spacer layer contains at least one selected from the group consisting of, for example, Ru, Ir, and Rh. Also, an underlayer may be provided on a lower surface of the first ferromagnetic layer 1. The underlayer enhances crystallinity of each layer constituting the laminate 10.

The wiring layer 20 is in contact with the first ferromagnetic layer 1. The wiring layer 20 generates a spin current due to a spin Hall effect when a current flows therethrough, and injects the spin into the first ferromagnetic layer 1. The wiring layer 20 is referred to as spin-orbit torque wiring. For example, the wiring layer 20 applies as much spin-orbit torque (SOT) as the magnetization of the first ferromagnetic layer 1 can be reversed to the magnetization of the first ferromagnetic layer 1. When a current density of the current flowing through the wiring layer 20 is equal to or higher than a critical current density, the magnetization of the first ferromagnetic layer 1 is reversed.

The spin Hall effect is a phenomenon in which a spin current is induced in a direction perpendicular to a direction in which a current flows on the basis of a spin-orbit interaction when the current is caused to flow. The spin Hall effect is the same as a normal Hall effect in that a movement (traveling) direction of moving (traveling) charge (electron) is bent. In the normal Hall effect, a movement direction of charged particles moving in a magnetic field is bent by a Lorentz force. On the other hand, in the spin Hall effect, a movement direction of spin is bent due to only movement of electrons (due to only a flow of current) even though a magnetic field is absent.

For example, when a current flows through the wiring layer 20, a first spin oriented in one direction and a second spin oriented in a direction opposite to the first spin are each bent in a direction perpendicular to a direction in which the current flows by the spin Hall effect. For example, the first spin oriented in a +y direction is directed in the +z direction, and the second spin oriented in a −y direction is directed in the −z direction.

In a non-magnetic material (a material that is not a ferromagnetic material), the number of electrons of the first spin and the number of electrons of the second spin generated by the spin Hall effect are equal. That is, the number of electrons of the first spin directed in the +z direction and the number of electrons of the second spin directed in the −z direction are equal. The first spin and the second spin flow in a direction to eliminate an uneven distribution of the spins. In the movement of the first spin and the second spin in the z direction, flows of charges cancel each other out, and thus an amount of current is zero. A spin current without a current is particularly referred to as a pure spin current.

When a flow of electrons in the first spin is expressed as $J_\uparrow$, a flow of electrons in the second spin is expressed as $J_\downarrow$, and a spin current is expressed as $J_S$, the spin current $J_S$ is defined as $J_S = J_\uparrow - J_\downarrow$. The spin current $J_S$ is generated in the z direction.

In the wiring layer 20, for example, side surfaces in the x direction and the y direction are inclined with respect to the z direction. An upper surface of the wiring layer 20 has, for example, a smaller area than a lower surface. A width of the upper surface of the wiring layer 20 in the x direction is smaller than, for example, a width of the lower surface in the x direction.

The wiring layer 20 has a first layer 21 and a second layer 22. A length of the first layer 21 in the x direction is larger than a length of the second layer 22 in the x direction. The second layer 22 is between the first layer 21 and the first ferromagnetic layer 1.

The first layer 21 is crystalline. That is, the first layer 21 is formed of a crystalline material. The first layer 21 may be a single crystal or a polycrystal in which crystal grains are aggregated as long as it has crystallinity. Whether or not "having crystallinity" can be determined by, for example, whether or not a diffraction pattern can be ascertained when nano-electron diffraction (NBD) is performed using a transmission electron microscope (TEM). The diffraction pattern is an electron image obtained by irradiating a sliced thin sample with an electron beam narrowed down to a diameter of about 1 nm, and transmitting and diffracting the electron beam. The diffraction pattern is one obtained by Fourier transforming crystal lattices, and is for observing a change in effective lattice constants and a change in crystal symmetry.

The second layer 22 is amorphous. That is, the second layer 22 is formed of an amorphous material. A diffraction pattern of the second layer 22 cannot be ascertained when nano-electron diffraction (NBD) is performed using a transmission electron microscope (TEM). The "diffraction pattern not being able to be ascertained" means that diffraction spots are not regularly disposed.

Figure 4:
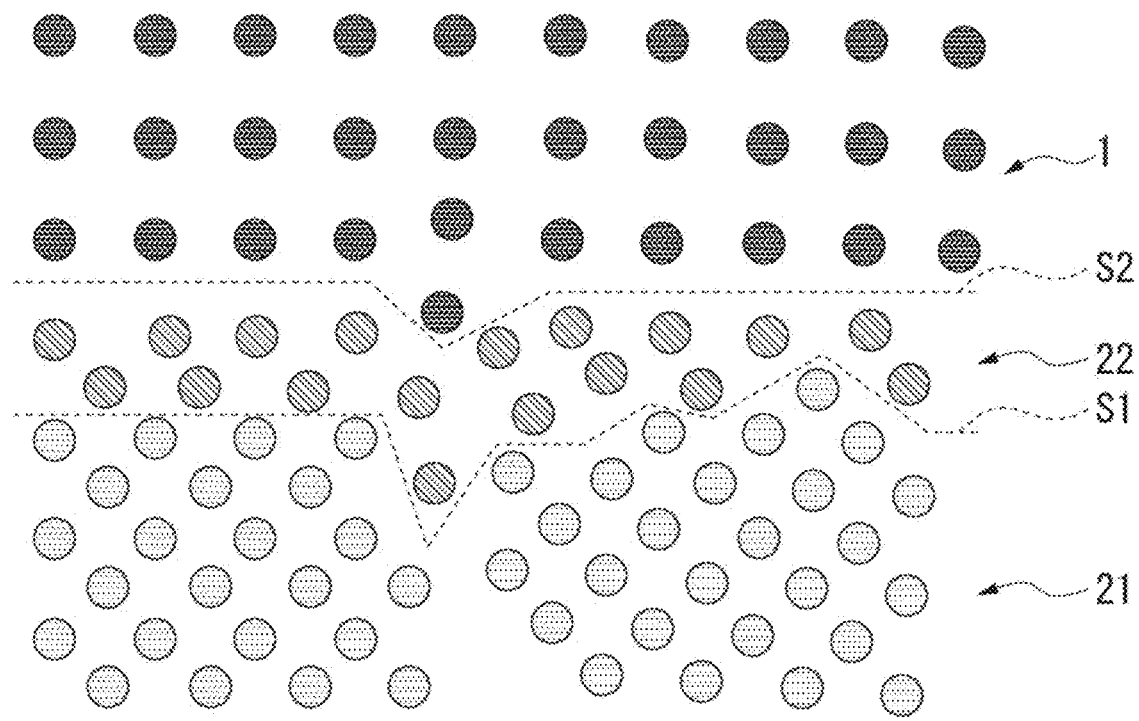
FIG. 4 is a cross-sectional view of a characteristic portion of the magnetic element according to the first embodiment.

FIG. 4 is a cross-sectional view of a characteristic portion of the magnetoresistance effect element 100 according to the first embodiment. FIG. 4 is an enlarged view of the vicinity of interfaces between the first layer 21, the second layer 22, and the first ferromagnetic layer 1. In FIG. 4, atoms constituting each layer are illustrated by "O (circle)."

The first layer 21 has crystallinity. Unless crystal growth is completely homogeneous, crystal grain boundaries or the like occur, and an interface S1 between the first layer 21 and the second layer 22 becomes uneven. Since the first layer 21 is usually deposited by sputtering or the like, it is difficult to make the crystal growth completely homogeneous.

The second layer 22 is deposited on the first layer 21. The second layer 22 is amorphous and is deposited to fill the unevenness of the interface St. As a result, the interface S2 between the first ferromagnetic layer 1 and the second layer 22 is flatter than the interface S1 between the first layer 21 and the second layer 22.

The first layer 21 contains any one of a metal, an alloy, an intermetallic compound, a metal boride, a metal carbide, a metal silicide, and a metal phosphide which have a function of generating a spin current due to a spin Hall effect when a current flows therethrough.

The first layer 21 contains, for example, a non-magnetic heavy metal as a main component. A heavy metal means a metal having a specific gravity equal to or higher than that of yttrium (Y). The non-magnetic heavy metal is, for example, a non-magnetic metal having a high atomic number such as the atomic number of 39 or higher having d electrons or f electrons in the outermost shell. The first layer 21 is formed of, for example, Hf, Ta, or W. A stronger spin-orbit interaction is generated in the non-magnetic heavy metal than in other metals. The spin Hall effect is generated by the spin-orbit interaction, and spins are likely to be unevenly distributed in the first layer 21 and the spin current $J_S$ is likely to be generated.

The first layer 21 may contain a magnetic metal. The magnetic metal is a ferromagnetic metal or an antiferromagnetic metal. A very small amount of magnetic metal contained in the non-magnetic material becomes a scattering factor of spins. The very small amount is, for example, 3% or less of a total molar ratio of elements constituting the first layer 21. When spins are scattered by the magnetic metal, the spin-orbit interaction is enhanced and spin current generation efficiency with respect to the current is improved.

The first layer 21 may contain a topological insulator. The topological insulator is a material in which the inside of the material is an insulator or a high resistance body, but a spin-polarized metal state is generated on its surface. In the topological insulator, an internal magnetic field is generated by a spin-orbit interaction. In the topological insulator, a new topological phase develops due to an effect of the spin-orbit interaction even in a case in which there is no external magnetic field. The topological insulator can generate a pure spin current with high efficiency due to a strong spin-orbit interaction and breaking of inversion symmetry at an edge.

The topological insulator includes, for example, SnTe, $Bi_{1.5}Sb_{0.5}Te_{1.7}Se_{1.8}$, $TlBiSe_2$, $Bi_2Te_3$, $Bi_{1-x}Sb_x$, $(Bi_{1-x}Sb_x)_2Te_3$, and the like. The topological insulators can generate a spin current with high efficiency.

An electric resistance of the first layer 21 may be lower than an electric resistance of the second layer 22 to be described in detail later. For example, the electric resistance of the first layer 21 may be ⅔ times or less or ½ times or less the electric resistance of the second layer 22. When the wiring layer 20 includes such first layer 21 and second layer 22, a current larger than that of the second layer 22 flows through the first layer 21, and large Joule heat is generated. Therefore, a heat flow is formed in the lamination direction from the first layer 21 toward the first ferromagnetic layer 1 via the second layer 22. Since heat and spin affect each other, the heat flow facilitates spin injection from the wiring layer 20 to the first ferromagnetic layer 1. That is, the magnetization of the first ferromagnetic layer 1 can be easily reversed with a small amount of current.

The second layer 22 may be formed of any material having conductivity. The second layer 22 contains at least one element of, for example, Ta. W, Ti, and Ag. These metal elements do not easily grow grains and they tend to be deposited to be flat. Also, these elements have a strong spin-orbit interaction, and spins can also be efficiently injected from the second layer 22 into the first ferromagnetic layer 1. Also, the second layer 22 may contain at least one element of, for example, Ag, Cu. Mg, and Al. These elements have long spin diffusion lengths and do not easily dissipate spin in the second layer 22.

Also, the second layer 22 may contain at least one element of Fe, Co, and Mn, and may contain any element of B or C. When the second layer 22 contains the same elements as the first ferromagnetic layer 1, a strong spin-orbit interaction is generated in the second layer 22, and a pure spin current can be generated with high efficiency.

Further, the second layer 22 may contain a nitride containing at least one element selected from the group consisting of Ti, V, Cr, Zr, Nb, Mo, Ta, and W. When the second layer 22 contains a nitride containing the elements included in the group, the second layer 22 functions not only as a spin conduction layer but also as a spin generation layer. That is, when a current flows in an in-plane direction of the second layer 22, a large spin-orbit torque is generated by a large spin Hall effect. The nitrides containing elements included in the group have lower electric resistance compared to heavy metals and are excellent in conductivity. Therefore, when the second layer 22 containing these nitrides is used, electric resistance can be lowered while maintaining a spin generation efficiency of the wiring layer 20.

A film thickness of the first layer 21 is, for example, 10 nm or less, and preferably 6 nm or less. The film thickness of the first layer 21 is, for example, 1 nm or tore. When the film thickness of the first layer 21 is sufficiently thin, a current density of the current flowing in the wiring layer 20 can be increased.

A film thickness of the second layer 22 is, for example, 4 nm or less. The second layer 22 has a film thickness corresponding to, for example, one atomic layer or more, and a film thickness of 1 nm or more. When the film thickness of the second layer 22 is equal to or less than a spin diffusion length of the second layer 22, spins generated in the first layer 21 can be efficiently injected into the first ferromagnetic layer 1.

Next, a method of manufacturing the magnetoresistance effect element 100 will be described. The magnetoresistance effect element 100 is formed by a laminating step of each layer, and a processing step of processing a part of each layer into a predetermined shape. A sputtering method, a chemical vapor deposition (CVD) method, an electron beam evaporation method (EB evaporation method), an atomic laser deposition method, or the like can be used for lamination of each layer. Processing of each layer can be performed using photolithography, etching, or the like.

First, a conductive layer to be the first layer 21 and a conductive layer to be the second layer 22 are laminated in order on the insulator In and the electrodes E2 and E3. A lamination surfaces of the insulator In and the electrodes E2 and E3 are planarized by, for example, chemical mechanical polishing (CMP). When the conductive layer to be the first layer 21 and the conductive layer to be the second layer 22 are processed into predetermined shapes, the first layer 21 and the second layer 22 can be obtained.

When the second layer 22 is deposited, a degree of vacuum is increased or deposition power is lowered compared to, for example, when the first layer 21 is deposited. When the second layer 22 is deposited, a degree of vacuum may be increased and deposition power may be lowered compared to, for example, when the first layer 21 is deposited. When the degree of vacuum is lowered or the deposition power is increased, crystal growth proceeds while growing grains, making it easier to form particulate crystals. On the contrary, when the degree of vacuum is increased and the deposition power is lowered, the film growth becomes slow and flatness of the interface S2 is enhanced.

Next, a ferromagnetic layer, a non-magnetic layer, and a ferromagnetic layer are formed in order on the second layer 22. Thereafter, when the layers described above are processed into predetermined shapes, the first ferromagnetic layer 1, the non-magnetic layer 3, and the second ferromagnetic layer 2 are formed, and thereby the laminate 10 is obtained. Thereafter, when the electrode E1 is deposited on the laminate 10, the magnetoresistance effect element 100 can be obtained.

Next, an operation of the magnetoresistance effect element 100 will be described. The magnetoresistance effect element 100 performs a write operation and a read operation.

A write operation of data to the magnetoresistance effect element 100 will be described. First, the first switching element Sw1 and the second switching element Sw2 connected to the magnetoresistance effect element 100 to which data is to be written are turned on. When the first switching element Sw1 and the second switching element Sw2 are turned on, a current flows through the wiring layer 20.

When the current flows through the wiring layer 20, the first spin is injected into the first ferromagnetic layer 1 due to the spin Hall effect. The magnetization of the first ferromagnetic layer 1 is reversed by receiving a spin-orbit torque generated by the injection of the first spin. When a magnetization direction of the first ferromagnetic layer 1 changes, a relative angle thereof with respect to a magnetization direction of the second ferromagnetic layer 2 changes, and a resistance value of the laminate 10 changes. The magnetoresistance effect element 100 stores data on the basis of the resistance value of the laminate 10. Therefore, data writing to the magnetoresistance effect element 100 is completed by the above-described procedure.

A read operation of data from the magnetoresistance effect element 100 will be described. First, the third switching element Sw3 and the second switching element Sw2 connected to the magnetoresistance effect element 100 from which data is to be read are turned ON. When the third switching element Sw3 and the second switching element Sw2 are turned on, a read current flows in the z direction of the laminate 10.

A resistance value of the laminate 10 differs depending on whether the magnetization of the first ferromagnetic layer 1 and the magnetization of the second ferromagnetic layer 2 are parallel or antiparallel. When the magnetization of the first ferromagnetic layer 1 and the magnetization of the second ferromagnetic layer 2 are parallel, the resistance value of the magnetoresistance effect element 100 decreases, and when the magnetization of the first ferromagnetic layer 1 and the magnetization of the second ferromagnetic layer 2 are antiparallel, the resistance value of the magnetoresistance effect element 100 increases. The resistance value of the magnetoresistance effect element 100 is output as a potential difference according to Ohm's law. Therefore, data reading from the magnetoresistance effect element 100 is completed by the above-described procedure.

In the magnetoresistance effect element 100 according to the first embodiment, the interface S2 is planarized by the presence of the second layer 22. A critical current density that reverses the magnetization of the first ferromagnetic layer 1 is strongly affected by the interface S2. This is because the spin injected into the first ferromagnetic layer 1 is affected by a Rashba effect at the interface or the like. When the interface S2 is flat, for example, variation of the critical current density in the element and variation thereof between the elements can be suppressed. The variation in the element is that a place in which magnetization tends to be locally reversed arises in one magnetoresistance effect element 100. The variation between elements is that ease of magnetization reversal of each of the plurality of magnetoresistance effect elements 100 varies. When the variation in the critical current density decreases, it is not necessary to design a higher critical current density required for performing reliable writing, and power consumption of the magnetoresistance effect element 100 can be reduced.

First Modified Example

Figure 5:
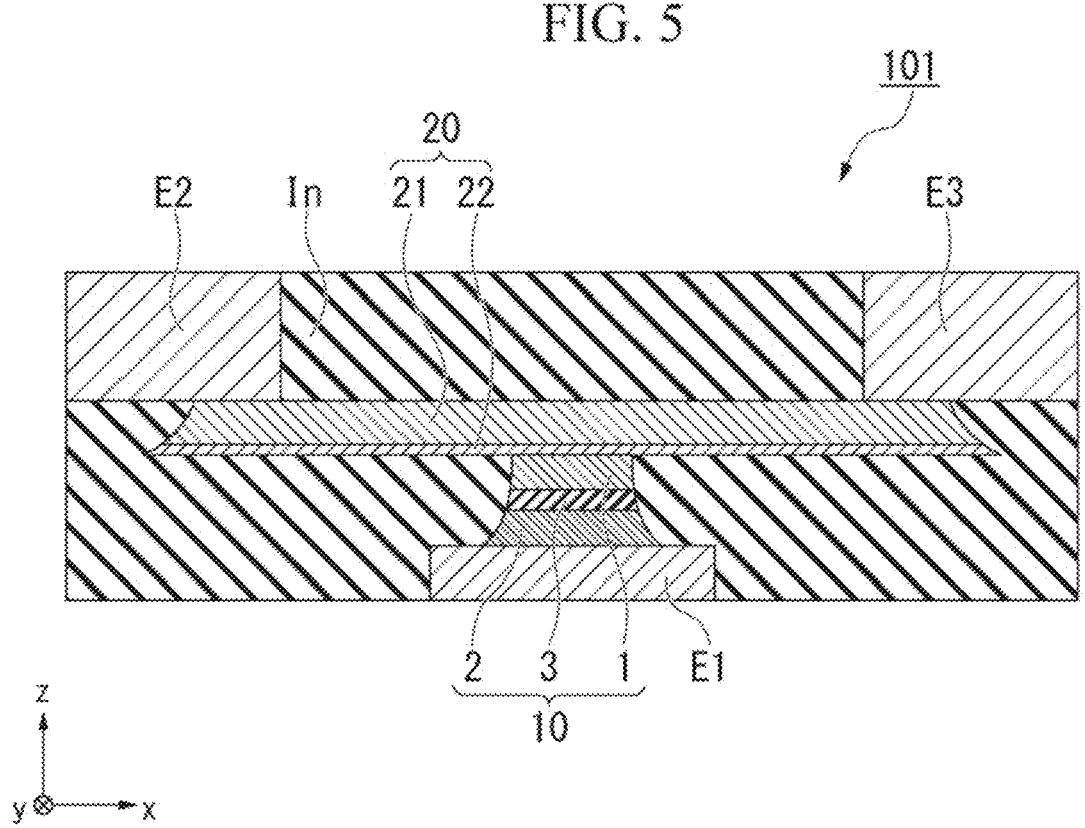
FIG. 5 is a cross-sectional view of a magnetic element according to a first modified example.

FIG. 5 is a cross-sectional view of a magnetoresistance effect element 101 according to a first modified example. FIG. 5 is a cross section of the magnetoresistance effect element 101 taken along the xz plane. The magnetoresistance effect element 101 illustrated in FIG. 5 differs from the magnetoresistance effect element 100 in a positional relationship of the components.

In the magnetoresistance effect element 101, the laminate 10 is on the substrate Sub side with respect to the wiring layer 20. In the laminate 10, the second ferromagnetic layer 2 serving as a magnetization fixed layer is positioned close to the substrate Sub. This configuration is referred to as a bottom pin structure. The bottom pin structure has higher magnetization stability of each layer than the top pin structure.

The wiring layer 20 includes the second layer 22 and the first layer 21 in order from a side closer to the laminate 10. The first layer 21 is on the second layer 22. A length of the second layer 22 in the x direction is larger than a length of the first layer 21 in the x direction. The second layer 22 is between the first layer 21 and the first ferromagnetic layer 1.

When the second layer 22 is between the first layer 21 and the first ferromagnetic layer 1, a flat interface is formed between the first layer 21 and the first ferromagnetic layer 1. As a result, the magnetoresistance effect element 101 according to the first modified example achieves the same effects as the magnetoresistance effect element 100 according to the first embodiment.

The integrated device according to the first embodiment can be used for, for example, a magnetic memory or the like.

Second Embodiment

An integrated device according to a second embodiment is different from the integrated device according to the first embodiment in that it has a magnetization rotational element 110 instead of the magnetoresistance effect element 100. Other configurations are the same as those of the integrated device 200 according to the first embodiment, and description thereof will be omitted.

Figure 6:
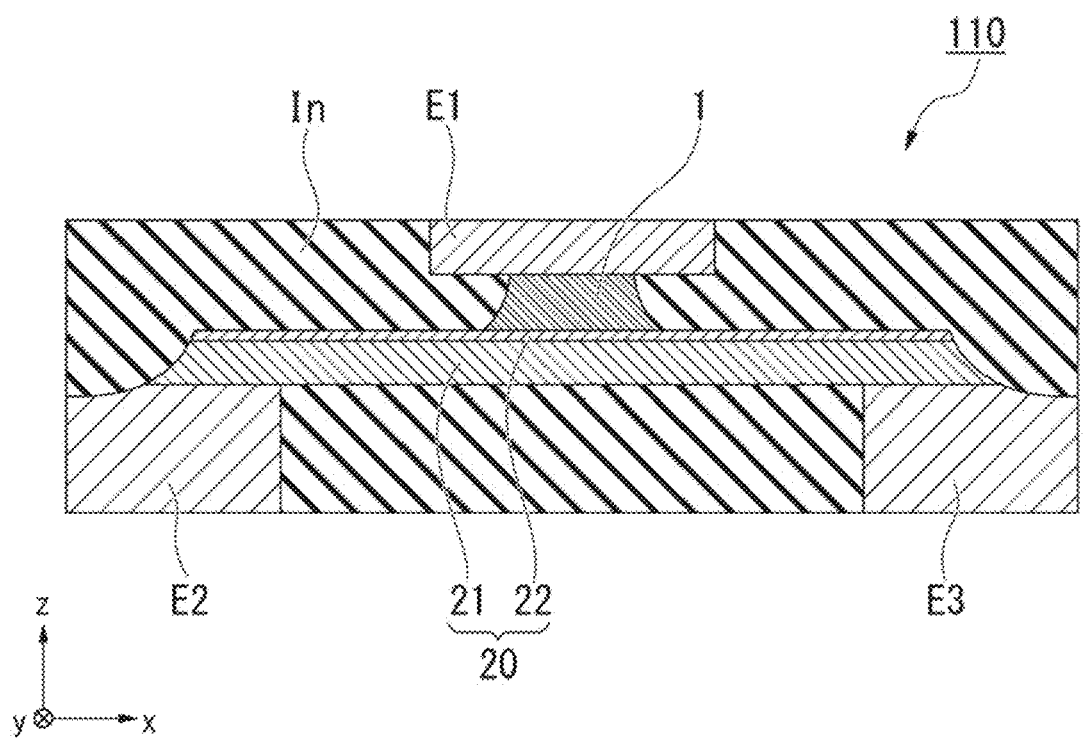
FIG. 6 is a cross-sectional view of a magnetic element according to a second embodiment.

FIG. 6 is a cross-sectional view of the magnetization rotational element 110 according to the second embodiment. FIG. 6 is a cross section of the magnetization rotational element 110 taken in an xz plane. The magnetization rotational element 110 is different from the magnetoresistance effect element 100 according to the first embodiment in that it does not include the non-magnetic layer 3 and the second ferromagnetic layer 2. Other configurations are the same as those of the magnetoresistance effect element 100 according to the first embodiment.

The magnetization rotational element 110 is an example of a magnetic element. The magnetization rotational element 110, for example, causes light to be incident on a first ferromagnetic layer 1 and evaluates light reflected by the first ferromagnetic layer 1. When an orientation direction of magnetization changes due to a magnetic Kerr effect, a polarization state of the reflected light changes. The magnetization rotational element 110 can be used as, for example, an optical element such as a video display device utilizing, for example, a difference in polarization state of light.

In addition, the magnetization rotational element 110 can be used singly as an anisotropic magnetic sensor or as an optical element utilizing a magnetic Faraday effect.

The magnetization rotational element 110 according to the second embodiment is one in which only the non-magnetic layer 3 and the second ferromagnetic layer 2 are removed, and can obtain the same effects as the magnetoresistance effect element 100 according to the first embodiment.

Third Embodiment

Figure 7:
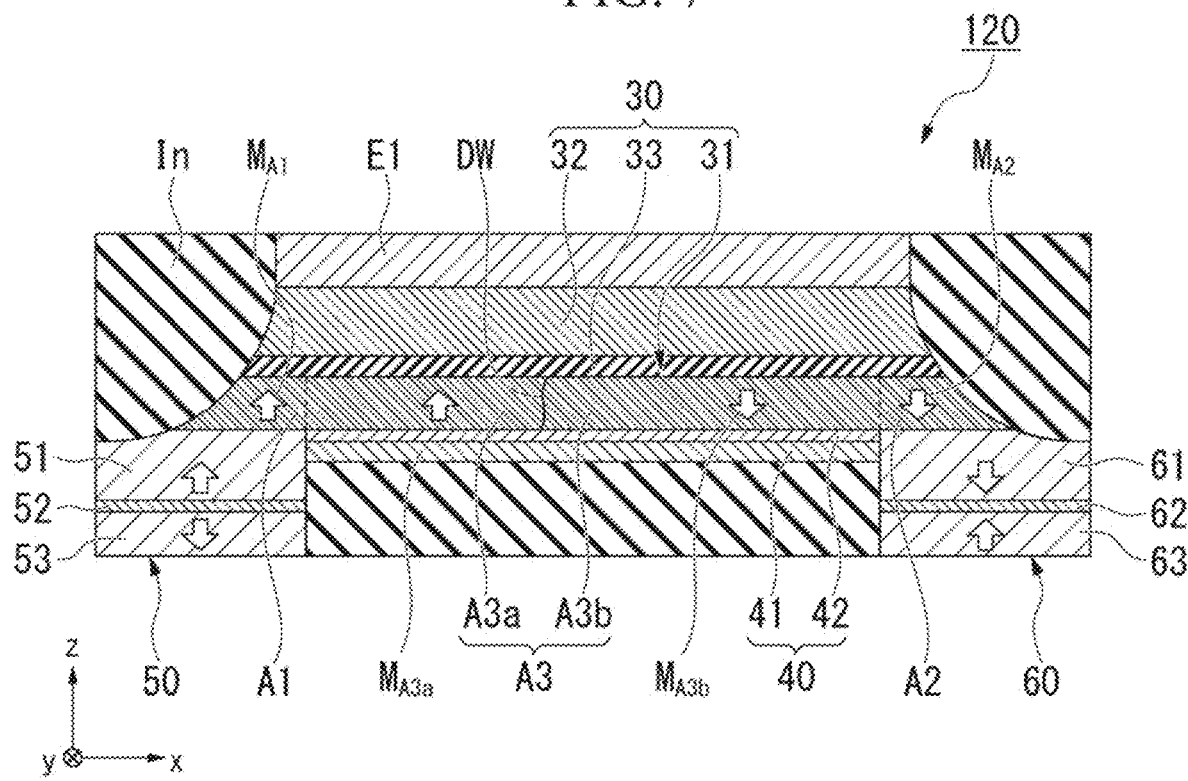
FIG. 7 is a cross-sectional view of a magnetic element according to a third embodiment.

FIG. 7 is a cross-sectional view of a magnetic domain wall movement element 120 according to a third embodiment. FIG. 7 is a cross section of a magnetic domain wall movement element taken in an xz plane.

The magnetic domain wall movement element 120 includes a laminate 30, a wiring layer 40, a first magnetization fixed layer 50, and a second magnetization fixed layer 60. The magnetic domain wall movement element 120 is an example of a magnetic element. The magnetic domain wall movement element 120 is an element whose resistance value changes due to movement of a magnetic domain wall DW.

The laminate 30 includes a first ferromagnetic layer 31, a second ferromagnetic layer 32, and a non-magnetic layer 33.

The first ferromagnetic layer 31 contains a ferromagnetic material. The magnetic material constituting the first ferromagnetic layer 31 can use a metal selected from the group consisting of Cr. Mn, Co, Fe, and Ni, an alloy containing one or more of these metals, an alloy containing these metals and at least one element of B, C, and N, or the like. Specifically. Co—Fe, Co—Fe—B, and Ni—Fe can be exemplified.

The first ferromagnetic layer 31 is a layer in which information can be magnetically recorded according to a change in internal magnetic state. The first ferromagnetic layer 31 includes a first region A1 and a second region A2 in which magnetization is fixed, and a third region A3 in which the magnetic domain wall DW can move.

The first region A1 is a region overlapping the first magnetization fixed layer 50 in a z direction. A magnetization $M_{A1}$ of the first region A1 is fixed by the first magnetization fixed layer 50. The second region A2 is a region overlapping the second magnetization fixed layer 60 in the z direction. A magnetization $M_{A2}$ of the second region A2 is fixed by the second magnetization fixed layer 60. An orientation direction of the magnetization Mm in the first region A1 is different from an orientation direction of the magnetization $M_{A2}$ in the second region A2.

The third region A3 has a first magnetic domain A3a and a second magnetic domain A3b inside. A magnetization $M_A$, of the first magnetic domain A3a and a magnetization $M_{A3b}$ of the second magnetic domain A3b are oriented, for example, in opposite directions. A boundary between the first magnetic domain A3a and the second magnetic domain A3b is the magnetic domain wall DW. The first ferromagnetic layer 1 can have the magnetic domain wall DW inside.

The magnetic domain wall movement element 120 can record data in a multi-valued or continuous manner according to a position of the magnetic domain wall DW. Data recorded in the first ferromagnetic layer 31 is read as a change in resistance value of the magnetic domain wall movement element 120 when a read current is applied.

The magnetic domain wall DW moves when a write current is caused to flow in an x direction of the first ferromagnetic layer 31 or an external magnetic field is applied. For example, when a write current (for example, a current pulse) is applied to the first ferromagnetic layer 31 in a +x direction, since electrons flow in a −x direction that is opposite to a direction of the current, the magnetic domain wall DW moves in the −x direction. When a current flows from the first magnetic domain A3a toward the second magnetic domain A3b, electrons spin-polarized in the second magnetic domain A3b causes the magnetization of the first magnetic domain A3a to be reversed. When the magnetization of the first magnetic domain A3a is reversed, the magnetic domain wall DW moves in the −x direction.

The second ferromagnetic layer 32 and the non-magnetic layer 33 are the same as the second ferromagnetic layer 2 and the non-magnetic layer 3 according to the first embodiment.

The wiring layer 40 includes a first layer 41 and a second layer 42. The wiring layer 40 is in contact with the first ferromagnetic layer 31, and is sandwiched between the first magnetization fixed layer 50 and the second magnetization fixed layer 60 in the x direction. The first layer 41 and the second layer 42 are the same as the first layer 21 and the second layer 22 according to the first embodiment.

The wiring layer 40 generates a spin current due to a spin Hall effect when a current flows therethrough, and injects the spin into the first ferromagnetic layer 1. The wiring layer 40 applies a spin-orbit torque (SOT) to, for example, a magnetization of the first ferromagnetic layer 1. The spin-orbit torque (SOT) generated by the spin injected from the wiring layer 40 assists movement of the magnetic domain wall DW. The magnetic domain wall DW of the first ferromagnetic layer 1 receives the spin-orbit torque (SOT) and becomes easy to move.

The first magnetization fixed layer 50 and the second magnetization fixed layer 60 are in contact with the first ferromagnetic layer. The first magnetization fixed layer 50 and the second magnetization fixed layer 60 are separated from each other in the x direction. The first magnetization fixed layer 50 fixes the magnetization of the first region A1. The second magnetization fixed layer 60 fixes the magnetization of the second region A2.

Shapes of the first magnetization fixed layer 50 and the second magnetization fixed layer 60 as viewed from the z direction are, for example, are rectangular, Shapes of the first magnetization fixed layer 50 and the second magnetization fixed layer 60 as viewed from the z direction may also be, for example, circular, elliptical, oval, or the like.

The first magnetization fixed layer 50 and the second magnetization fixed layer 60 contain, for example, a ferromagnetic material. The first magnetization fixed layer 50 includes a ferromagnetic layers 51 and 53 and a spacer layer 52. The spacer layer 52 is between the ferromagnetic layer 51 and the ferromagnetic layer 53. The second magnetization fixed layer 60 includes a ferromagnetic layers 61 and 63 and a spacer layer 62. The spacer layer 62 is between the ferromagnetic layer 61 and the ferromagnetic layer 63.

The ferromagnetic layers 51, 53, 61, and 63 can use a material the same as that of the second ferromagnetic layer 2. The spacer layers 52 and 62 are non-magnetic materials. The spacer layers 52 and 62 contain, for example, Ru, Ir, or Rh. The ferromagnetic layer 51 and the ferromagnetic layer 53, and the ferromagnetic layer 61 and the ferromagnetic layer 63 are magnetically coupled in an antiferromagnetic manner, respectively.

Further, the first magnetization fixed layer 50 and the second magnetization fixed layer 60 are not limited to a ferromagnetic material. When the first magnetization fixed layer 50 and the second magnetization fixed layer 60 are not ferromagnetic materials, a current density of a current flowing through the first ferromagnetic layer 1 changes abruptly in a region in which the first ferromagnetic layer 31 overlaps the first magnetization fixed layer 50 or the second magnetization fixed layer 60, and thereby movement of the magnetic domain wall DW is restricted and the magnetizations of the first region A1 and the second region A2 are fixed.

The magnetic domain wall movement element 120 according to the third embodiment includes the second layer 42, and thereby an interface between the wiring layer 20 and the first ferromagnetic layer 1 is planarized. As a result, variation in an amount of spin injected from the wiring layer 40 into the first ferromagnetic layer 1 decreases. Also, unevenness of the surface is one of the factors (pinning site) that hinder movement of the magnetic domain wall DW, but planarization of the interface makes the magnetic domain wall DW move smoothly. Therefore, the magnetic domain wall movement element 120 can be driven with low power consumption.

Second Modified Example

Figure 8:
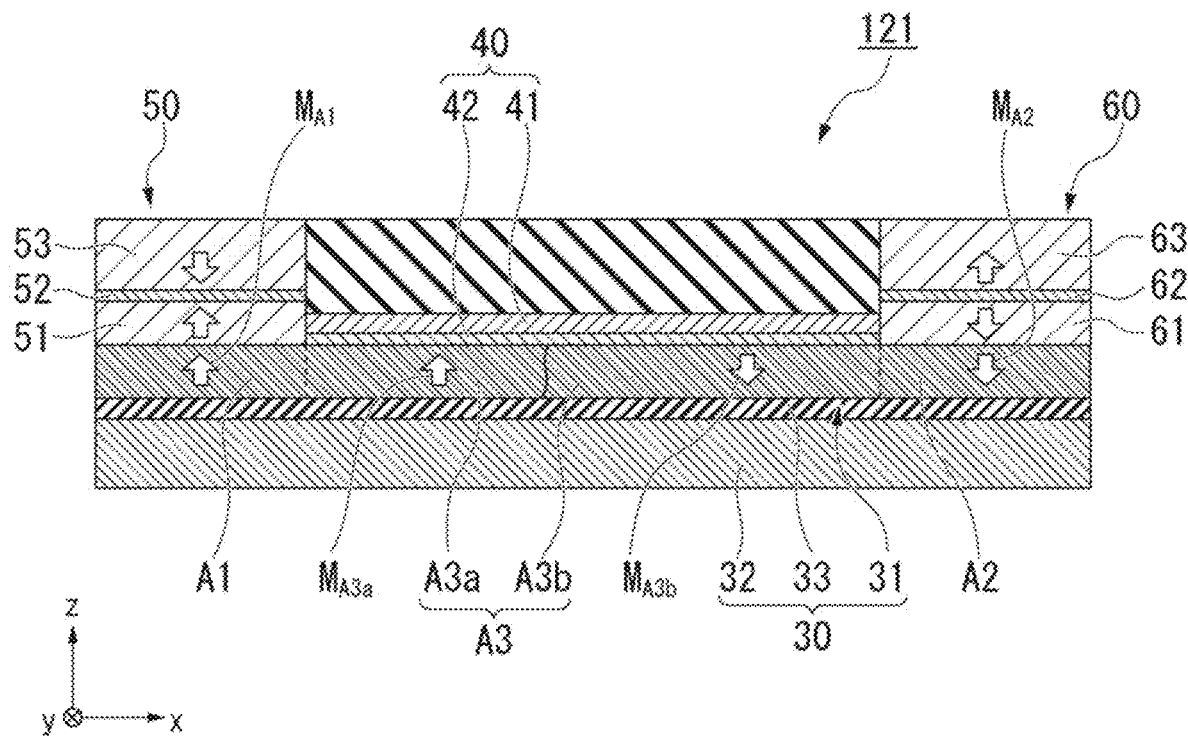
FIG. 8 is a cross-sectional view of a magnetic element according to a second modified example.

FIG. 8 is a cross-sectional view of a magnetic domain wall movement element 121 according to a second modified example. FIG. 8 is a cross section of the magnetic domain wall movement element 121 taken in the xz plane. The magnetic domain wall movement element 121 illustrated in FIG. 8 is different from the magnetic domain wall movement element 120 in a positional relationship of the components.

In the magnetic domain wall movement element 121, the laminate 30 is on the substrate Sub side with respect to the wiring layer 40. In the laminate 30, the second ferromagnetic layer 32 serving as a magnetization fixed layer is positioned close to the substrate Sub. This configuration is referred to as a bottom pin structure. The bottom pin structure has higher magnetization stability of each layer than the top pin structure.

The wiring layer 40 includes the second layer 42 and the first layer 41 in order from a side closer to the laminate 30. The first layer 41 is on the second layer 42. A length of the second layer 42 in the x direction is larger than a length of the first layer 41 in the x direction. The second layer 42 is between the first layer 41 and the first ferromagnetic layer 31.

When the second layer 42 is between the first layer 41 and the first ferromagnetic layer 31, a flat interface is formed between the first layer 41 and the first ferromagnetic layer 31. As a result, the magnetic domain wall movement element 121 according to the second modified example achieves the same effects as the magnetic domain wall movement element 120 according to the third embodiment.

The integrated device according to the third embodiment can be applied to an analog device, a spin memristor, and a neuromorphic device.

For example, a neuromorphic device is a device that mimics a human brain using a neural network. The neuromorphic device artificially mimics a relationship between neurons and synapses in a human brain.

The neuromorphic device includes, for example, hierarchically disposed chips (neurons in a brain) and means of communication (synapses in a brain) connecting the chips. The neuromorphic device learns using the means of communication (synapses) to increase a percentage of questions answered correctly. The learning is to find knowledge that can be used in the future from information, and input data is weighted by the neuromorphic device Each synapse mathematically performs a product-sum operation. In the magnetic recording arrays according to the first to third embodiments, the magnetoresistance effect elements or the magnetization rotational elements are disposed in an array, and thereby a product-sum operation can be performed. For example, when a current is caused to flow through a read path of the magnetoresistance effect element, a product of the input current and a resistance of the magnetoresistance effect element is output, and thereby a product operation is performed. When a plurality of magnetoresistance effect elements are connected by a common wiring, the product operations are added by the common wiring, and thereby a sum operation is performed. Therefore, the magnetic recording array according to the third embodiment can be applied to a neuromorphic device as a product-sum operation unit.

As described above, preferred embodiments of the present invention have been exemplified on the basis of the first to third embodiments, but the present invention is not limited to these embodiments. For example, characteristic configurations in each of the embodiments may be applied to other embodiments.

REFERENCE SIGNS LIST

1, 31 First ferromagnetic layer
2, 32 Second ferromagnetic layer
3, 33 Non-magnetic layer
10, 30 Laminate
20, 40 Wiring layer
21, 41 First layer
22, 42 Second layer
50 First magnetization fixed layer
60 Second magnetization fixed layer
100, 101 Magnetoresistance effect element
110 Magnetization rotational element
120, 121 Magnetic domain wall movement element
200 Integrated device
DW Magnetic domain wall

The invention claimed is:

1. A magnetic element comprising:
a wiring layer; and
a first ferromagnetic layer in contact with the wiring layer, wherein
the wiring layer includes:
a crystalline first layer; and
an amorphous second layer which is between the first ferromagnetic layer and the first layer, and
wherein the second layer contains a nitride containing at least one element selected from the group consisting of Ti, V, Cr, Zr, Nb, Mo, Ta, and W.

2. The magnetic element according to claim 1, wherein an electrical resistivity of the first layer is lower than an electrical resistivity of the second layer.

3. The magnetic element according to claim 1, wherein the second layer contains at least one element of Ta, W, Ti, and Ag.

4. The magnetic element according to claim 1, wherein the second layer contains at least one element of Fe, Co, and Mn.

5. The magnetic element according to claim 1, wherein the second layer contains any element of B or C.

6. The magnetic element according to claim 1, wherein a film thickness of the second layer is 4 nm or less.

7. The magnetic element according to claim 1, wherein a film thickness of the first layer is 10 nm or less.

8. A magnetic element comprising:
a wiring layer; and
a first ferromagnetic layer in contact with the wiring layer, wherein
the wiring layer includes:
a crystalline first layer; and
an amorphous second layer which is between the first ferromagnetic layer and the first layer, and wherein
the wiring layer has a length in a first direction larger than a length in the other direction, and
a length of the first layer in the first direction is larger than a length of the second layer in the first direction.

9. A magnetic element comprising:
a wiring layer; and
a first ferromagnetic layer in contact with the wiring layer, wherein
the wiring layer includes:
a crystalline first layer; and
an amorphous second layer which is between the first ferromagnetic layer and the first layer, and wherein
the wiring layer has a length in a first direction larger than a length in the other direction, and
a length of the second layer in the first direction is larger than a length of the first layer in the first direction.

10. The magnetic element according to claim 1, further comprising a second ferromagnetic layer and a non-magnetic layer, wherein
the non-magnetic layer is sandwiched between the first ferromagnetic layer and the second ferromagnetic layer.

11. The magnetic element according to claim 1, further comprising a first magnetization fixed layer and a second magnetization fixed layer, wherein the first magnetization fixed layer and the second magnetization fixed layer are in contact with the wiring layer at positions sandwiching the first ferromagnetic layer, and the first ferromagnetic layer has a magnetic domain wall inside.

12. An integrated device comprising a plurality of magnetic elements according to claim 1.

* * * * *